United States Patent Office 3,047,556
Patented July 31, 1962

3,047,556
PROCESS FOR THE PRODUCTION OF POLYVINYL HYDROGEN SULPHATES
Jenö Szita, Hechtsheim, near Mainz, Germany, assignor to Farbenfabriken Bayer Aktiengesellschaft, Leverkusen, Germany, a corporation of Germany
No Drawing. Filed Jan. 12, 1960, Ser. No. 1,872
Claims priority, application Germany Jan. 17, 1959
5 Claims. (Cl. 260—91.3)

The present invention relates to novel chemical compounds, namely polyvinyl hydrogen sulphates, which are esterified up to a high degree and further to a process for their production.

Processes for the production of alkali metal polyvinyl sulphates are already known (see, for example, U.S. patent specification No. 2,623,037). These processes, however, possess the disadvantage that only a comparatively small degree of esterification is achieved despite the prolonged reaction periods which are employed.

It is an object of the present invention to provide new chemical compounds more specially polyvinyl hydrogen sulphates which are esterified up to 100%. Another object is to provide a process for the production of said polyvinyl hydrogen sulphates which can readily be carried out and which leads to substantial yields. A still further object of the present invention is to provide polyvinyl hydrogen sulphates by using a salt of chloro sulphonic acid and pyridine as an esterification agent. Still further objects will become apparent hereinafter.

It has now been found that polyvinyl hydrogen sulphates which are up to 100% esterified are obtained by reacting a polyvinyl alcohol with a pyridine solution of a salt of chlorosulphonic acid and pyridine.

The chlorosulphonic acid-pyridine salt employed in the process according to the present invention may be prepared by reacting chlorosulphonic acid with an excess of anhydrous pyridine. The reaction proceeds rapidly and exothermically. The chlorosulphonic acid-pyridine salt is soluble in hot pyridine. The solution thus obtained can be used directly in the esterification reaction. The chlorosulphonic acid-pyridine salt is obtained in the form of colourless needle-shaped crystals by cooling a saturated solution of the salt in pyridine.

Polyvinyl alcohols suitable for employment in the process according to the present invention are those which have a molecular weight of from 1000 to 500,000. Polyvinyl alcohols having a molecular weight of from 10,000 to 100,000 are particularly preferred.

In carrying out the process according to the present invention the chlorosulphonic acid-pyridine salt is dissolved in pyridine and the polyvinyl alcohol is slowly added to the solution. The polyvinyl alcohol may be added as such or in the form of a suspension in pyridine. Owing to its basic character, the pyridine combines with the hydrochloric acid which is formed as a by-product in the reaction and thereby assists the esterification reaction. Polyvinyl alcohols have a low solubility in pyridine, even at relatively high temperatures, whereas the reaction products enter into solution when the degree of esterification reaches 70 to 75%. Thus the progress and the termination of the reaction can be readily controlled. The pyridine also acts as a diluent, thus moderating the comparatively strong exothermic reaction. It is essential to employ anhydrous reactants in the process according to the present invention.

The temperature and the concentration of the reactants may be varied within wide limits. Generally speaking there will be employed from 1 to 5 mols, and preferably from 1 to 2 mols, of chlorosulphonic acid-pyridine salt, per mol of vinyl alcohol unit. The amount of pyridine employed may be from 1 to 10 mols per mol of vinyl alcohol unit. The pyridine is preferably employed in an amount of from 2.5 to 5 mols per mol of vinyl alcohol unit. The lower limit of the reaction temperature depends on the concentration of the chlorosulphonic acid-pyridine salt in solution.

The temperature must at least be such that the salt remains completely dissolved. The upper temperature limit is generally determined by the boiling point of the pyridine, although it is possible to work under pressure. Especially good results are obtained by using reaction temperatures of from 75° C. to 115° C. Under these conditions reaction times of about ½ to 1 hour are necessary.

When working in this way the polyvinyl hydrogen sulphate-pyridine salt is first of all obtained. The pyridine may be liberated from the polyvinyl hydrogen sulphate-pyridine salt by means of alkali and removed by distillation. The free acid is obtained by treating the alkali metal polyvinyl sulphate thus obtained with, for example, a cation exchanger.

By comparison with the known processes, the process according to the present invention produces a polyvinyl hydrogen sulphate which is 100% esterified. The products obtained by the process according to the present invention differ from the known products with a lower degree of esterification, for example as regards solubility, softening point etc. Moreover, the reaction times necessary to produce the desired products are substantially shorter than in the case of the known processes.

The compounds produced by the process according to the present invention are excellently suitable for use as supports for acrylonitrile graft polymers (cf. copending American application Serial No. 859,551), which are characterised by improved dyeing capacity with basic dyestuffs, by a lighter initial tone and better heat stability. The same applies as regards filaments, fibres and the like which are produced from these graft polymers. Furthermore, the products produced by the process according to the present invention can be used in the textile industry as filament sizes and as anti-static agents.

The present invention is further disclosed in the following example which is illustrative but not limitative thereof.

*Example*

116.5 parts by weight (1 mol) of chlorosulphonic acid are slowly introduced dropwise and while stirring into 180 parts by weight (2.3 mols) of anhydrous pyridine. The temperature rises to 80° C. (On cooling the reaction mixture to below 70–75° C., the chlorosulphonic acid-pyridine salt precipitates from the mixture as a colourless crystalline material.) A suspension of 44 parts by weight (1 mol) of polyvinyl alcohol in 80 parts by weight (1 mol) of anhydrous pyridine is slowly added while stirring to the chlorosulphonic acid-pyridine salt solution at a temperature of 80° C. The temperature rises to 115° C. The solution is stirred for another 40 minutes at 100 to 110° C., a viscous yellowish brown solution being formed. This solution is then diluted with 200 parts by weight of water and poured into 5000 parts by volume of industrial methanol for precipitation purposes. After drying the isolated product for a short time in vacuo at 40–50° C., it is again dissolved in water. 30 parts by weight of sodium hydroxide (in 10% aqueous solution) are added to this solution. The liberated pyridine is distilled off in vacuo at about 50° C. and the solution is concentrated. After filtration, the reaction product is precipitated from the viscous solution with methanol and dried in vacuo. The yield of sodium polyvinyl sulphate is 121 parts by weight.

From the dried sodium polyvinyl sulphate (a brownish yellow resinous substance) a 3% aqueous solution is prepared and this solution is passed over a cation exchanger containing sulphonic acid groups. The resulting solution of polyvinyl hydrogen sulphate is concentrated in vacuo, again dissolved in a little dimethyl formamide and, the reaction product is precipitated with n-butanol. The product is then dried at 50° C. in vacuo. There is thus obtained a white, amorphous, brittle material, which quickly becomes tacky in air because of its hydroscopic nature. It has good solubility in water and dimethyl formamide, but is insoluble in n-butanol and sparingly soluble in acetone, cyclohexanone and tetrahydrofuran. The aqueous solution has a strong acid reaction.

Determination of the sulphate groups with N/10 NaOH shows that 99.6% of the hydroxyl groups are esterified.

I claim:

1. A process for the production of polyvinyl hydrogen sulfates containing 70–100% of sulfuric acid groups referred to the hydroxy groups of the polyvinyl alcohol which comprises heating a pyridine solution of a chlorosulfonic acid-pyridine salt and polyvinyl alcohol, the molar ratio between the hydroxyl groups of the polyvinyl alcohol and said pyridine salt being 1:1 to 1:5.

2. Process according to claim 1, wherein the polyvinyl alcohol has a molecular weight of from 10,000 to 100,000.

3. Process according to claim 1, wherein the reaction temperature is from 75 to 115° C.

4. Process according to claim 3, wherein the molar ratio of vinyl alcohol unit to pyridine is approximately from 1:1 to 1:10.

5. A process for the production of polyvinyl hydrogen sulfates containing 70–100% of sulfuric acid groups based on the hydroxyl groups of the polyvinyl alcohol which comprises adding a pyridine solution of polyvinyl alcohol to a pyridine solution of a chlorosulfonic acid-pyridine salt, the molar ratio between the hydroxyl groups of the polyvinyl alcohol and said pyridine salt being about 1:1 to 1:5, heating the mixture to a temperature of about 100–110° C., precipitating the reaction product by dispersing in water and precipitating with methanol, dissolving the reaction product in an aqueous solution followed by the addition of sodium hydroxide thereto, distilling the pyridine from the solution and recovering the sodium polyvinyl sulfate residue, and then treating the latter with a cation exchanger to form a solution of said polyvinyl hydrogen sulfate.

References Cited in the file of this patent

UNITED STATES PATENTS 2,623,037 Jones _____ Dec. 23, 1952